Sept. 20, 1960 H. C. EBERLY 2,953,082
WIRE TIE MECHANISM
Filed Aug. 22, 1957 3 Sheets-Sheet 3
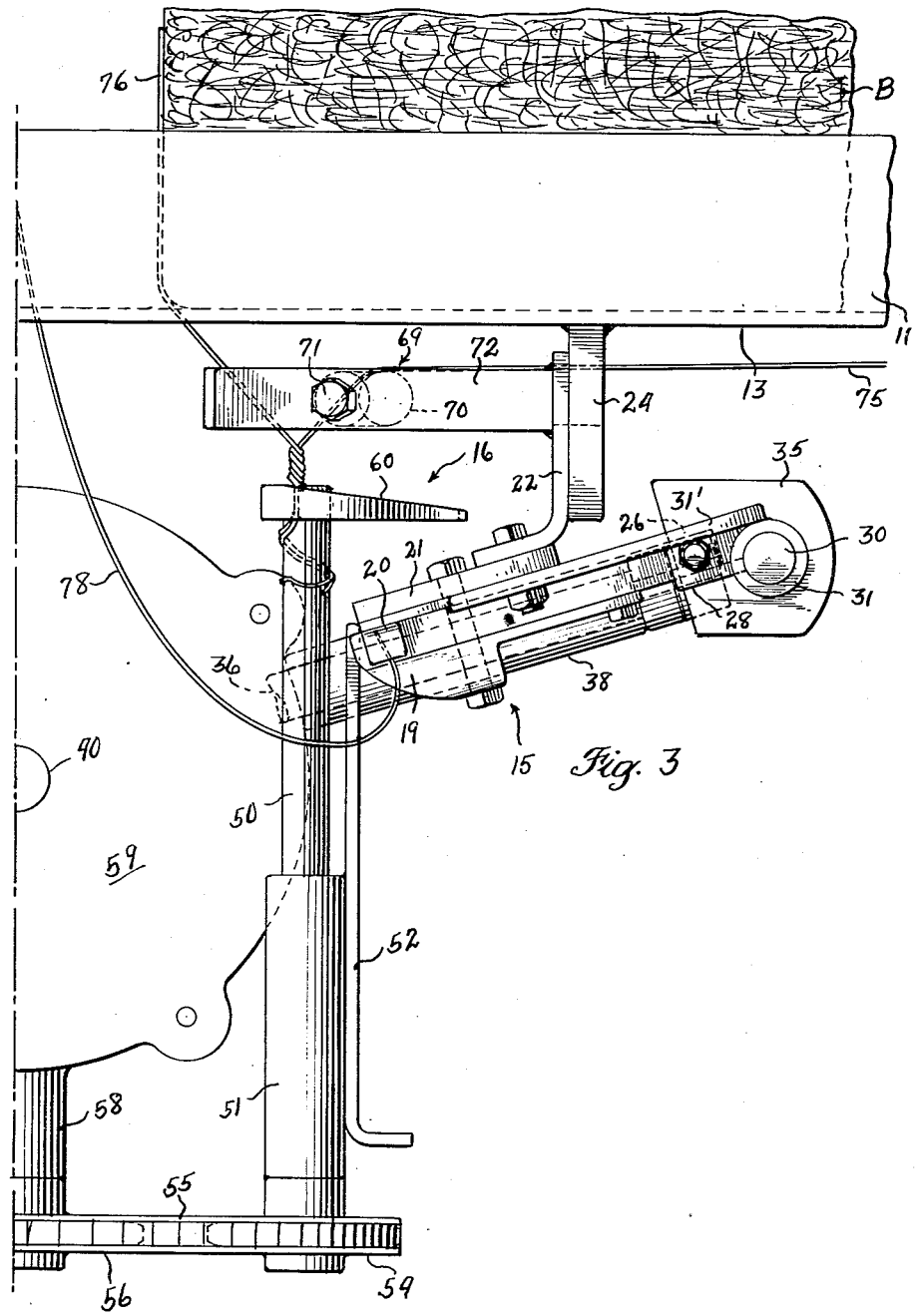
INVENTOR
HARRY C. EBERLY
Joseph Allen Brown
ATTORNEY

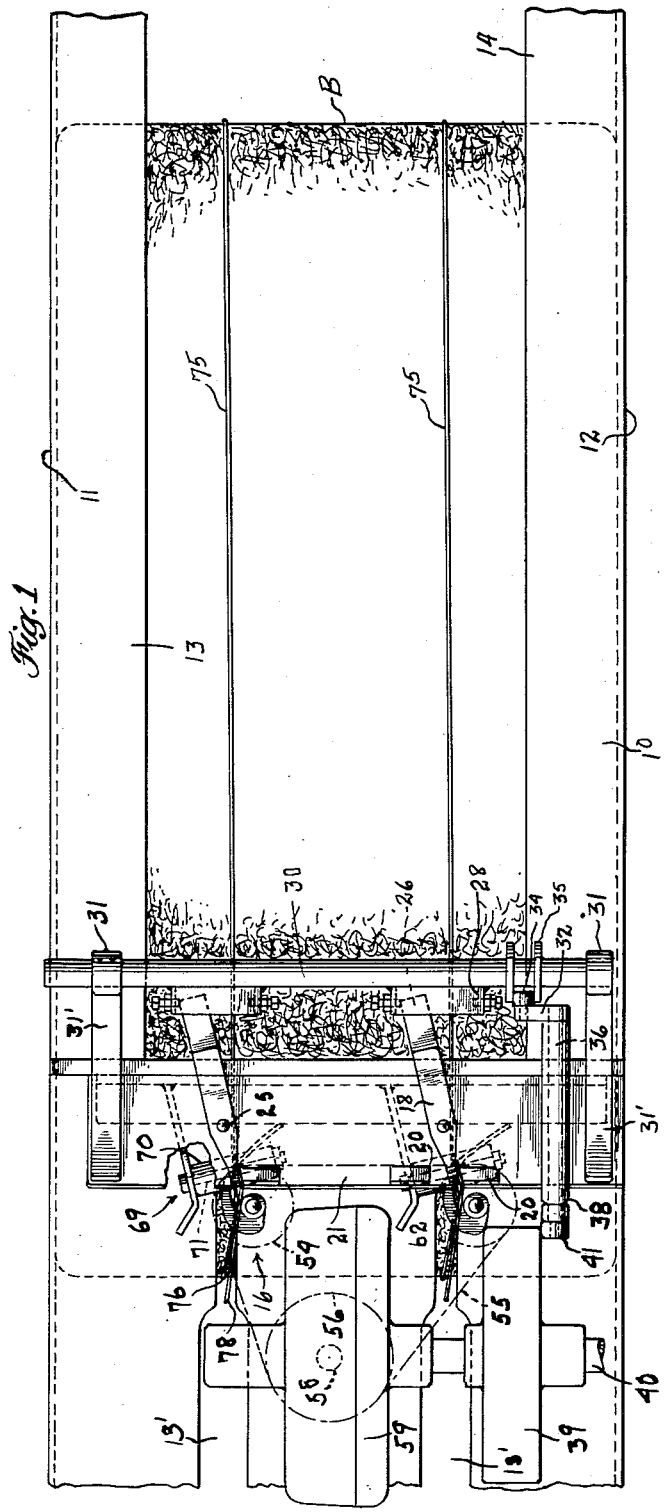

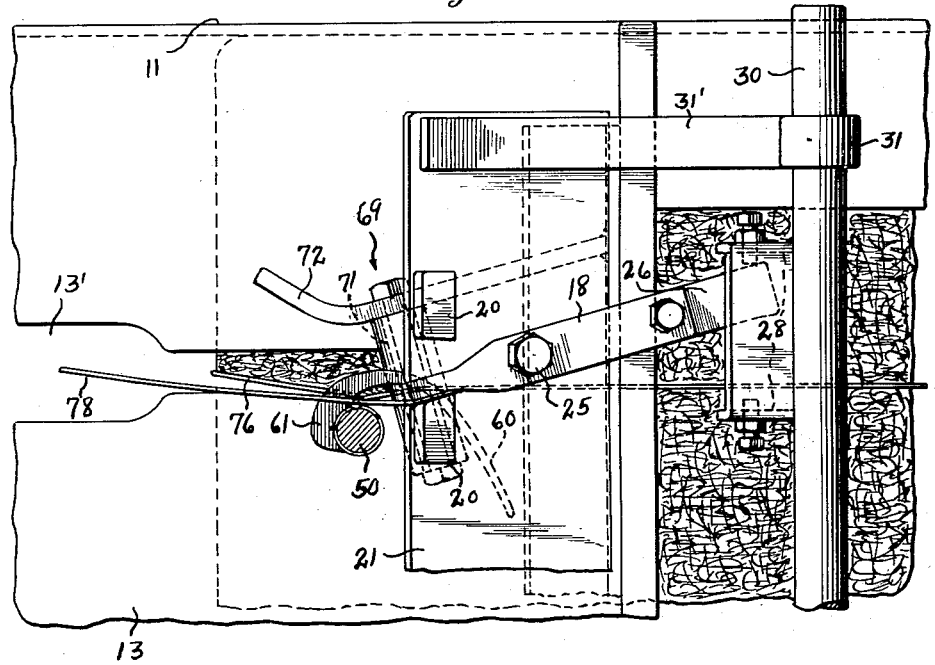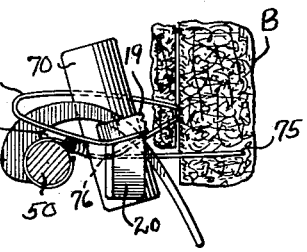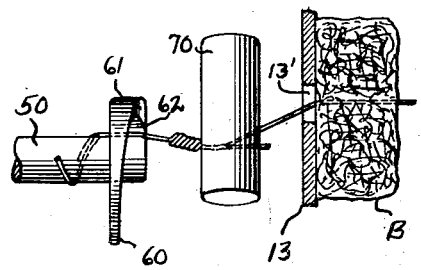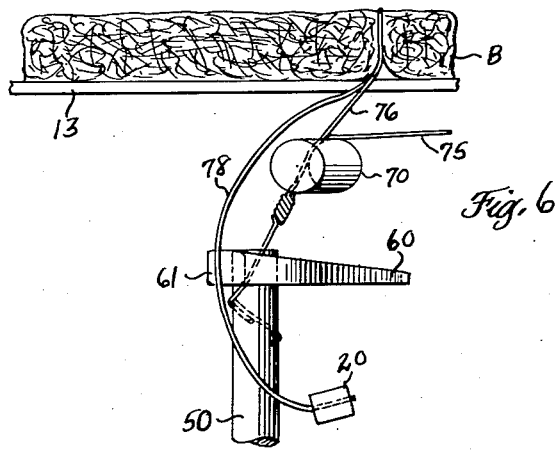

United States Patent Office 2,953,082
Patented Sept. 20, 1960

2,953,082

WIRE TIE MECHANISM

Harry C. Eberly, Narvon, Pa., assignor to Sperry Rand Corporation, New Holland, Pa., a corporation of Delaware Filed Aug. 22, 1957, Ser. No. 679,695

4 Claims. (Cl. 100—21)

This invention relates to wire tie hay balers, and more particularly to hay balers having binding mechanisms such as shown in U.S. Patent No. 2,551,873, issued May 8, 1951.

In the baler shown in the above mentioned patent, there is a bale case into which crop material is delivered. A plunger, reciprocable in the case, compresses the material so delivered into bales and moves each bale as it is formed towards one end of the bale case. At one side wall of the bale case there is provided a pair of wire clamps. Each wire clamp holds a free end of wire. The wires extend from the clamps across the bale case to the opposite side wall thereof and then to a supply source. As a bale takes form, it moves against these wires causing them to be extended around two sides and one end of the bale. When the bale is completely formed, a tripping mechanism actuated by a rotatable metering wheel institutes a tying operation. Loops of wire are projected from the opposite side of the bale case, where the wire supply is located, and around the other end of the bale. Such wires are delivered to the side of the bale case having the wire clamps, and one strand of each loop is laid across one of the clamped free ends. A twister hook rotatably mounted adjacent each clamp is rotated, such hook engaging the wires at their intersection and twisting them together. A free end strand and one of the strands delivered from the opposite side of the bale case comprise a tie. The other strand of a loop is cut and clamped and provides the new free end wire for the formation of the next bale.

The free end wires held in the clamps as the bale takes shape, are commonly referred to as the No. 1 wires. The strands of the loops which are twisted with the free end wires are referred to as the No. 2 wires. The other strands of the loops which become the new free ends are referred to as the No. 3 wires. Hereinafter, the respective wires will be referred to by these designations.

The No. 1, free end wires are placed under considerable tension as the bales are being formed. After the completion of the bale, this tension remains because of the force of the just completed bale against the No. 1 wires. The No. 2 wires delivered around the end of the bale also have tension on them. However, generally such tension is somewhat less than that on the No. 1 wires. In some wire tie mechanisms, means is provided whereby the needles which deliver the wire loops back off a little after delivering the loops to provide some slack in the No. 2 wires. Other means has and can be provided for providing the No. 2 wires with sufficient slack.

When the No. 1 and No. 2 wires are twisted together, there is a tendency to increase the tension on the No. 1 wires. This is because portions of the wires go into making up the twist, the twists being formed by the portions of the wires extending from the twister hook and around the bale. Excessive tension on the No. 1 wires is undesirable since it may snap the wires.

Another difficulty is encountered in getting the twist out of the hook after the tie has been completed. The incoming material moving against the completed bale forces the completed bale towards the bale case outlet. Such movement of the bale pulls the twist from the twister hook. Occasionally, the wires catch on to the hook and resist being freed therefrom. If caught securely, breakage of the No. 1 or No. 2 wires may result.

One object of this invention is to provide means whereby the tension on the No. 1 wires will be automatically relieved as the twisting operation takes place.

Another object of this invention is to provide means for directing completed twists out of twister hooks when they are pulled off by the incoming material moving against the completed bale.

A further object of this invention is to provide a unitary means which accomplishes both of the above objects.

A still further object of this invention is to accomplish the above objects with a device which is of simple construction and has few parts thereby enabling it to be manufactured at low cost.

Other objects of this invention will be apparent hereinafter from the specification and from the recital in the appended claims.

In the drawings:

Fig. 1 is a fragmentary side elevation of a bale case of hay baler having a wire tie mechanism mounted thereon and including a device constructed according to this invention;

Fig. 2 is an enlarged fragmentary side elevation of a portion of one of the wire tiers shown in Fig. 1;

Fig. 3 is an enlarged plan view showing one of the wire tiers and a wire twist at completion, just before it is stripped from the twister hook;

Fig. 4 is a generally diagrammatic plan view showing two wires laid in the twister hook and ready for tying;

Fig. 5 is a diagrammatic view similar to Fig. 4 showing the twist partly completed;

Fig. 6 is a diagrammatic plan view showing the completed twist in the act of being pulled away from the hook;

Fig. 7 is a side view of Fig. 6;

Fig. 8 is a view looking from right to left in Fig. 7; and

Fig. 9 is a side elevation of a part of the device.

Referring now to the drawings by numerals of reference, and particularly to Figs. 1–3, 10 denotes a rectangular bale case having a top wall 11, a bottom wall 12, a side wall 13 and an opposite side wall, not shown. Hay is delivered by any suitable mechanism into bale case 10 at the left end thereof, when viewed as shown in Fig. 1, and compressed by a plunger or the like into bales. Each bale, denoted B, moves toward the right as it is formed and towards an open end 14 of the bale case.

Mounted on side wall 13 is a wire tying mechanism which includes two wire clamps 15 and two wire twisters 16. One clamp is associated with one twister and the other clamp with the other twister.

Each wire clamp comprises a medially pivoted clamp member 18 (Fig. 2) having a clamping and cutting end 19 alternately cooperative with a pair of fixed, spaced, cutclamp elements 20. Elements 20 are carried on a fixed plate 21 connected to a bracket 22 (Fig. 3) which is in turn fastened to a support 24 on side wall 13. Each wire clamp is pivotal on a bolt 25 on plate 21.

Each wire clamp has an end 26 which extends into a space between two fixed abutment elements 28—28 carried on a vertically extending shift-rod 30. Shift-rod 30 is supported in bearings 31—31 for slideable up and down reciprocable movement relative to bale case 10. Bearings 31 are carried on support arms 31' affixed to plate 21 and bracket 22 and thereby to side wall 13. The shift-rod is reciprocated by means of a rotatable lever arm 32 (Fig. 1) having a lateral member 34 extending between spaced ears 35 on the shift-rod whereby when the lever arm is rotated the shift-rod is reciprocated.

Lever arm 32 is rotated from a shaft 36 rotatable in a sleeve 38 supported on plate 21. Shaft 36 is adapted to be rotated 180° in one direction during one tying cycle and 180° in the opposite direction during the next tying cycle. The specific means for achieving such rotation is unimportant to the present invention. A cam 39 carried on a drive shaft 40 and cooperative with a cam 41 on shaft 36, as shown, may be employed.

If shaft 30 is shifted downwardly from the position shown in Fig. 1, the clamp members 18 will be pivoted about 25 and the ends 19 of the clamp members will shift from clamping relationship with one element 20 to the other associated element 20. Thus a clamped No. 1 wire may be freed and a new wire, deposited between a pair of elements 20, clamped and cut to provide a No. 2 wire for the formation of a twist and a No. 3 wire for the next bale.

Each wire twister device comprises a shaft 50 rotatably supported in a sleeve 51 carried on a bracket 52 connected to plate 21. Shaft 50 extends perpendicular to the side wall 13 of bale case 10. It has a sprocket 54 connected to its outer end. Trained around the sprockets for the respective shafts 50 is an endless chain 55 which is also trained around a drive sprocket 56. Drive sprocket 56 is keyed to an output shaft 58 of a gear box 59. Power is admitted to the gear box through shaft 40 from a source of power, not shown.

Affixed to the inner end of each shaft 50 and extending in a plane generally perpendicular to the axis of the shaft is a hook 60. Hook 60 is of arcuate configuration, having a root end 61 connected to shaft 50 and forming therewith a pocket 62 (Fig. 7) for the reception of wires to be twisted together.

Such structure provides the operational environment of applicant's improvement which resides in the devices 69 cooperative with the twisting mechanism. There is one device associated with each twister-clamping unit. Each device comprises a cylindrical roller or guide 70 rotatable on a pin 71 extending from a bracket 72 welded to bracket 22. As shown in Fig. 1, rollers 70 extend downwardly from their support brackets, being inclined relative to vertical toward the open end 14 of bale case 10. The rollers are of such length that they extend in front of and completely across the pockets 62 in the twister hooks.

At the beginning of each bale, a free end of wire is clamped at 19—20 in each twisting unit. Such free end of wire, denoted 75, extends as shown in Fig. 3, that is, from the twister hook 60, around roller 70, through side wall 13, across the bale case to the opposite side thereof and the supply spool. As hay is delivered into the bale chamber and formed into a bale, the bale moves towards the open end 14 of the bale chamber, and wire 75, or the free end No. 1 wire, forms a loop around two sides and one end of the bale. After the bale is completed, suitable tripping mechanism, not shown, actuates the tying operation. Loops of wire are delivered from the wire supply spool side of the bale case, around the rear end of the bale, and through suitable openings 13' in side 13. One strand 76 of each loop abuts against the end of the bale and is extended to a position where it crosses a clamped free end wire 75. The delivered strands of wire 76, or No. 2 wires, are cut and clamped, the loop strands associated with strands 76 becoming the new No. 1 wires and denoted 78.

Each hook 60 is so disposed that when it rotates it engages two crossed wires and twists them together. Fig. 4 shows the twist just as it is starting. Fig. 5 shows the twist partially completed; and Fig. 3 shows the completed twist. Fig. 6 shows the twist as it is being stripped from the twister hook.

It will be observed from the drawings, that each free end or No. 1 wire 75 extends from the twister hook 60, around a roller 70 and then rearwardly towards the open end of the bale case when a twist is being made. From the twister hook to the roller, the No. 1 wire extends rearwardly relative to the bale case. Each No. 2 wire 76, extends from the twister hook and forwardly relative to the bale case. As can be seen from Fig. 4, the No. 1 and 2 wires form a V, the apex of which is located at the pocket 62 of the twister hook 60. When the twist is made, this apex moves coaxial to shaft 50 and away from the pocket 62 (Fig. 3).

As the twisting operation commences, the No. 1 wire 75 is disposed on guide roller 70 as shown in Fig. 4. However, because of the inclined mounting of roller 70, when the twisting of the wires takes place and the tension on the No. 1 wire is increased, there is a tendency for wire 75 to slide on the periphery of the roller and longitudinally relative to the axis of the roller. The wire 75 moves from the position shown in Fig. 4 toward the position shown in Fig. 5 as the twist takes form. As the wire is moved along, additional free end wire is provided for the twist since the angle from the twist to the roller gradually increases. Thus, an increase in tension on the No. 1 wire as the twist is made is prevented. At the completion of the twist, the No. 1 wire has moved to the position shown in Fig. 3. The total movement of the No. 1 wire is indicated by the arrow 79 in Fig. 9.

The first function of the roller 70 is, therefore, to provide means for preventing an increase in the tension on the No. 1 wire as a twist is made. A fixed guide member extending perpendicular to the bale case and to the extension of the No. 1 wire will not accomplish this result. While the rearward inclination of the guides 70 need not be at a precise degree, it has been found that a rearward inclination of from 5 to 15 degrees is usually appropriate. Further, while the movement of the No. 1 wire is not great, it makes a material difference in the efficient operation of the wire tier.

In addition to relieving the tension on the No. 1 wire as the twist is formed, roller 70 serves to direct the twist out of the twister hook after the twist has been completed. Referring to Fig. 3, it is shown that after the No. 1 and No. 2 wires are twisted together their free ends extend around the twister shaft 50. The new free end wires 78 extend from the clamping means 19—20 and across bale case 10. The next charge of material to begin the formation of the next bale engages wire 78 (Figs. 6–8) and the material is forced against the rear end of the completed bale B. The completed bale is moved longitudinally in the bale case towards the open end thereof. This longitudinal movement tends to pull the twists from the twister hook. This pulling force serves to strip the twist off the hook. However, the removal of a twist from the hook is facilitated if the wires move toward the open end of the pocket 62. Again roller 70 comes into play. As the twist moves rearwardly, it is urged by the roller 70 in a downward, rearward direction. This downward, rearward direction is the same direction as the opening in pocket 62 in twister hook. Thus, the effort necessary to remove the twist from the hook is minimized. Breakage of the wires adjacent the twist because of wires holding onto the twister shaft is greatly minimized.

It will also be noted, that roller 70 is rotatable on the shaft 71. Thus, it tends to rotate with the movement of the wire, and relative movement between the roller and the wires is minimized thereby lessening wear on the wires.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. An improvement in a wire tie baler having, in combination, a bale case into which crop material is fed and formed into bales, a releaseable clamp on one side of said bale case for holding a free end of a wire, said wire extending from said clamp across said bale case to the side thereof opposite said one side, a bale as it is formed moving from a forward end toward a rear end of the bale case and against said wire whereby the wire is pushed rearwardly and extended around two sides and one end of the bale, a loop of said wire being adapted to be carried around the other end of the bale from said opposite side to said one side of said bale case to complete a band around said bale and one strand of said loop being extended adjacent said free end, said band of wire extending in a given plane, a rotatable shaft extending outwardly from said one bale case side and having an inner and an outer end, a wire twisting element connected to said inner end and having a pocket to receive both said free end wire and said one strand of said loop, said wires being in abutting relationship in said pocket, said element being adapted to twist the wires together on rotation of said shaft, said free end and one strand of said loop after having been twisted being stripped from said pocket by movement of the bale toward said rear end of said bale case, and means for relieving tension on said free end wire during a twisting operation, the improvement residing in said tension relieving means which comprises a stationary guide member mounted on said one side of said bale case between said twister element and the bale case and transversing said wire plane, said free end wire being extendable over said guide member and then rearwardly and being laterally slidable thereon over a portion thereof whereby said wire may assume a given medial position on said portion of said guide member when a bale is formed and being shiftable laterally from said medial portion during a twisting operation, said portion of said guide member over which said wire is laterally slidable being inclined in one direction rearwardly relative to said bale case and forming an angle with said wire plane other than 90°.

2. An improvement in a wire tie baler as recited in claim 1 wherein said guide member is elongate and cylindrical, and mounted on said bale case for rotation about its longitudinal axis.

3. An improvement in a wire tie baler as recited in claim 1 wherein said guide member is inclined from about 5° to 15° relative to a direction perpendicular to said wire plane.

4. An improvement in a wire tie baler as recited in claim 1 wherein said pocket in said twisting element opens in a given direction and said portion of said guide member is inclined in said given direction.

References Cited in the file of this patent

UNITED STATES PATENTS

| | | |
|---|---|---|
| 737,246 | Johnston | Aug. 25, 1903 |
| 764,318 | Towner | July 5, 1904 |
| 787,008 | Taylor | Apr. 11, 1905 |
| 873,835 | Bower | Dec. 17, 1907 |
| 1,258,848 | Zachow | Mar. 12, 1918 |
| 2,403,396 | Raney | July 2, 1946 |
| 2,513,967 | Raney et al. | July 4, 1950 |
| 2,612,099 | McClellan et al. | Sept. 30, 1952 |

FOREIGN PATENTS

| | | |
|---|---|---|
| 158,733 | Australia | Sept. 9, 1954 |
| 314,460 | Germany | Sept. 19, 1919 |
| 691,675 | France | July 27, 1930 |
| 735,850 | France | Sept. 6, 1932 |